United States Patent [19]

Hujita

[11] Patent Number: 4,692,679

[45] Date of Patent: Sep. 8, 1987

[54] PULSE MOTOR

[75] Inventor: Yutaka Hujita, Shizuoka, Japan

[73] Assignee: Tokyo Electric Co., Ltd., Tokyo, Japan

[21] Appl. No.: 861,563

[22] Filed: May 9, 1986

[30] Foreign Application Priority Data

May 21, 1985 [JP] Japan ................................ 60-108719

[51] Int. Cl.[4] ............................................. H02P 8/00
[52] U.S. Cl. .................................... 318/696; 318/685
[58] Field of Search ................................. 318/696, 685

[56] References Cited

U.S. PATENT DOCUMENTS 4,412,166 10/1983 Crider et al. ......................... 318/696
4,514,675 4/1985 Matumoto et al. .................. 318/696

OTHER PUBLICATIONS

Stepping Motors and Their Microprocessor Controls; pp. 30–39, pp. 44–45 and pp. 84–85; Takashi Kenjo; Oxford Science Publications.

Primary Examiner—William M. Shoop, Jr.
Assistant Examiner—Saul M. Benjamin
Attorney, Agent, or Firm—Frishauf, Holtz, Goodman & Woodward

[57] ABSTRACT

A pulse motor comprises A-and C-phase coils wound on a common core with opposite polarities appearing on the core, B- and D-phase coils wound on a common core with opposite polarities appearing on the core, first, second, third and fourth switching transistors connected in series with A-, B-, and C-and D-phase coils, respectively, and a control signal for controlling respective conduction states of the first, second, third and fourth switching transistors to permit a sequential excitation of the A-and B-phase coils, B-and C-phase coils, C-and D-phase coils, and D-and A-phase coils in this order. After a predetermined time following a start of the turning-OFF of one of said first, second, third and fourth switching transistors another one of the first, second, third and fourth transistors is turned ON.

8 Claims, 23 Drawing Figures

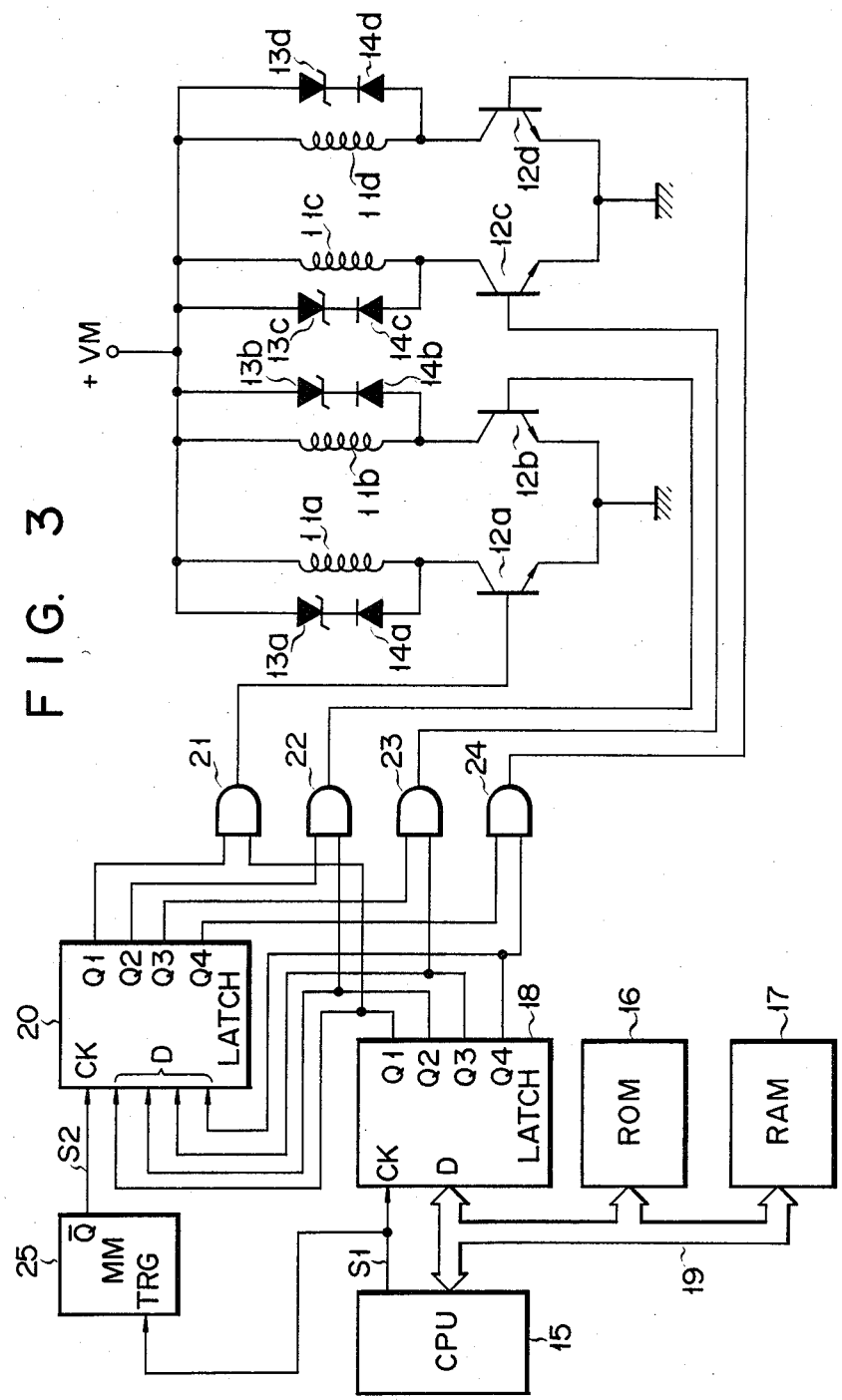
F I G. 3

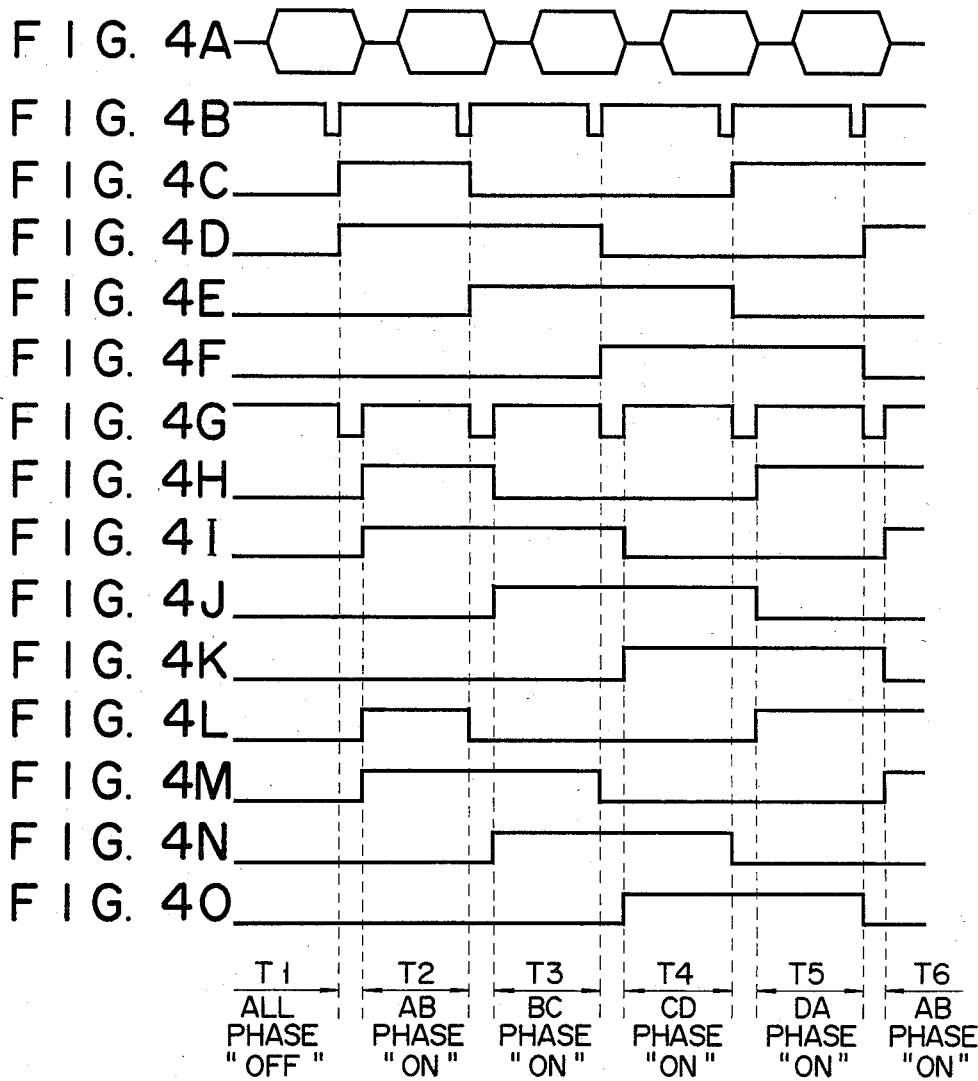

PULSE MOTOR

BACKGROUND OF THE INVENTION

This invention relates to a pulse motor which is driven in a four-phase coil arrangement.

FIG. 1 shows a conventional pulse motor. In this pulse motor, coils 1a, 1b, 1c and 1d corresponding to A-, B-, C and D-phases are connected between a supply terminal +VM and ground, respectively, through NPN type transistors 2a, 2b, 2c and 2d. A series circuit of zener diode 3a and diode 4a, that of zener diode 3b and 4b, that of zener diode 3c and 4c and that of zener diode 3d and diode 4d are connected in parallel with coils 1a, 1b, 1c and 1d, respectively, through NPN type transistors 2a, 2b, 2c and 2d with the polarities of their diodes indicated in FIG. 1, in which case these zener diodes 3a, 3b, 3c and 3d serve as surge absorbing circuits. Coil 1a of the A-phase and coil 1c of the C-phase are wound on a common pole with their respective magnetic fluxes being excited in directions such as to cancel each other, and coil 1b of the B-phase and coil 1d of the D-phase are wound on a common pole with their respective magnetic fluxes being excited in directions such as to cancel each other, This is described in "STEPPINGMOTORS AND THEIR MICROPROCESSOR CONTROLS" by TAKASHI KENJI published from Oxford University Press in 1984.

Read only memory ROM 6 for control, random access memory RAM 7 for control, and phase output latch circuit 8 are connected to central processing unit CPU 5 via data bus 9. CPU 5 supplies phase control data and a data write signal S to phase output latch circuit 8 on the basis of program data of ROM 6. Phase control latch circuit 8, upon receipt of the data write signal S, takes the phase control data from bus line 9 for latching. Phase control signals are supplied from output terminals Q1, Q2, Q3 and Q4 of latch circuit 8 to the bases of transistors 2a, 2b, 2c and 2d, respectively.

The phase control data and data write signal S are supplied from CPU 5 to phase output latch circuit 8 at times, respectively, of FIGS. 2(A) and 2 (B). Each time the data write signal S is supplied to phase output latch circuit 8, the output signals of phase output latch circuit 8 vary as shown in FIGS. 2(C) through 2(F). That is, at a time T1 the control signals of all the phases become low, while, on the other hand, at a time T2 the control signals of the A-and B-phases become high and control signals of the C-and D-phases become low. In other words, the signals on the output terminals Q1 and Q2 of latch circuit 8 become high and signals on the output terminals Q3 and Q4 of latch circuit 8 become low. As a result, transistors 2a and 2b are turned ON to permit currents to pass through A-phase coil 1a and B-phase coil 1b. At a time T3, the signals on the output terminals Q2 and Q3 of latch circuit 8 become high and signals on the output terminals Q4 and Q1 of latch circuit 8 become low to permit currents to pass through B-phase coil 1b and C-phase coil 1c. At a time T4 the signals on the output terminals Q3 and Q4 become high and signals on the output terminals Q1 and Q2 become low to permit currents to pass through C-phase coil 1c and D-phase coil 1d. At a time T5 signals on the output terminals Q4 and Q1 of latch circuit 8 become high and signals on the output terminals Q2 and Q3 of latch circuit 8 become low to permit currents to pass through D-phase coil 1d and A-phase coil 1a. At a time T6, the signals on the output terminals Q1 and Q2 of the latch circuit 8 go high and signals on the output terminals Q3 and Q4 go low to permit currents to pass through A-phase coil 1a and B-phase coil 1b. In this way the conduction states are switched in the order of the A-and B-phases, B-and C-phases, C-and D-phases and D-and A-phases. It is to be noted that the turn-ON times of transistors 2a...2d are longer than the turn-OFF times of transistors 2a... 2d, respectively. Now suppose that, for example, the conduction states are switched from the A-and B-phases to the B-and C-phases. At this time, transistor 2a starts to be turned OFF and, after transistor 2c has been turned ON, transistor 2a is turned OFF. At this switching time, transistors 2a and 2c are set in the ON states, simultaneously. Since at this time the A-phase coil 1a and C-phase coil 1c are wound on their common core with their respective magnetic fluxes being excited in directions such as to cancel each other, the inductance components of coils 1a and 1c cancel each other and the sum of the inductance components become zero. Thus, coils 1a and 1c possess only resistive components, permitting a flow of a larger current. If in this way such a larger current flows through the respective coil, a breakage problem occurs on transistors 2a to 2d.

SUMMARY OF THE INVENTION

It is accordingly the object of this invention to provide a pulse motor which prevents a breakage of transistors for controlling the conduction states of their motor coils and thus improves their reliability.

To attain this object there is provided a pulse motor comprising:

A-and C-phase coils wound on a common pole with opposite polarities appearing on the pole and B-and D-phase coils wound on a common pole with opposite polarities appearing on the pole;

first to fourth switching circuits connected in series with the A-phase to D-phase coils respectively; and a control circuit for generating phase control signals for controlling respective conduction states of first to fourth switching circuits to permit a sequential excitation of the A-and B-phase coils, B-and C-phase coils, C-and D-phase coils and D-and A-phase coils in this order in each cycle, in which after a predetermined time following a start of the turning-OFF of one of the switching circuits in the respective phase switching operation another one of these switching circuits is turned ON in each cycle.

According to this invention, since at the time of a phase switching operation, one of the switching circuits attains a substantial nonconductive state a predetermined time after it has commenced to be turned OFF, another one of these switching circuits is turned ON, there being no possibility that larger current will flow through two coils connected to the corresponding switching circuits.

BRIEF DESCRIPTION OF THE DRAWINGS

FIG. 3 is a circuit diagram showing a pulse motor according to one embodiment of this invention; and FIGS. 4A through 4O are signal waveform diagrams for explaining the operation of the pulse motor shown in FIG. 3.

Figure 1:
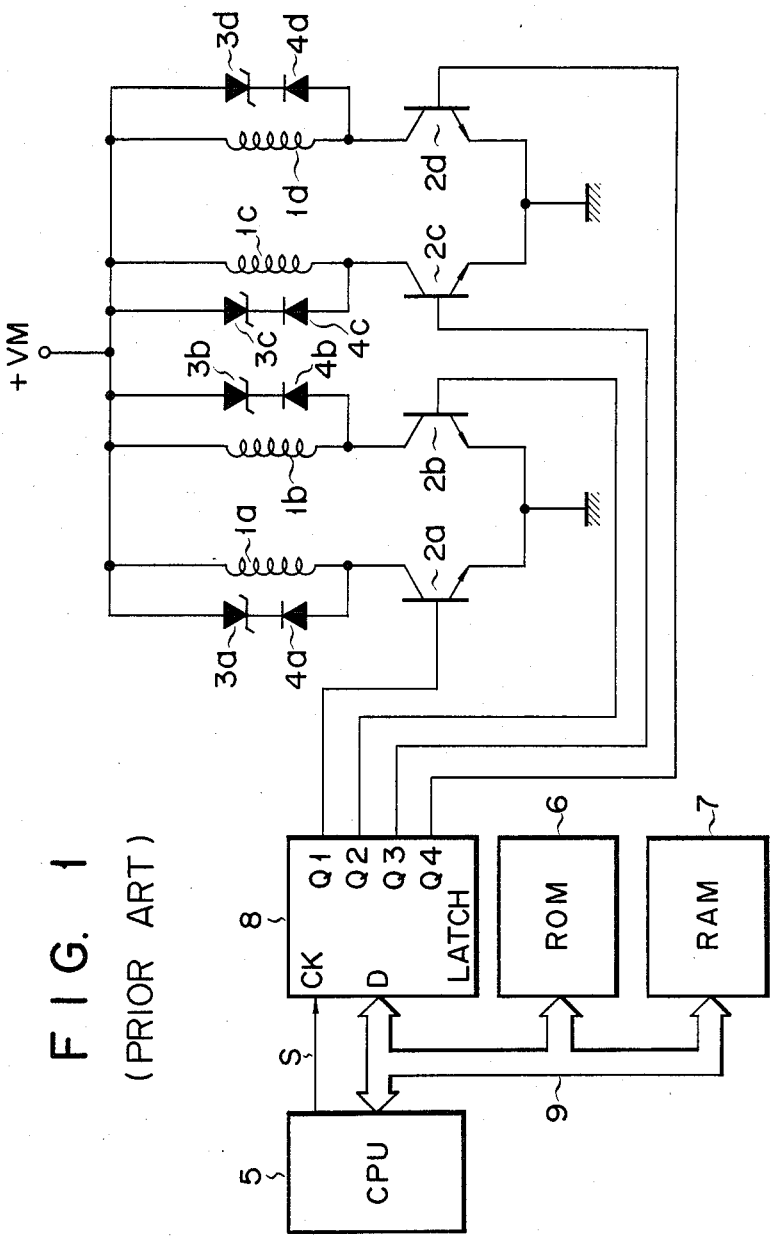
FIG. 1 is a circuit diagram showing a conventional pulse motor.
Figure 2:
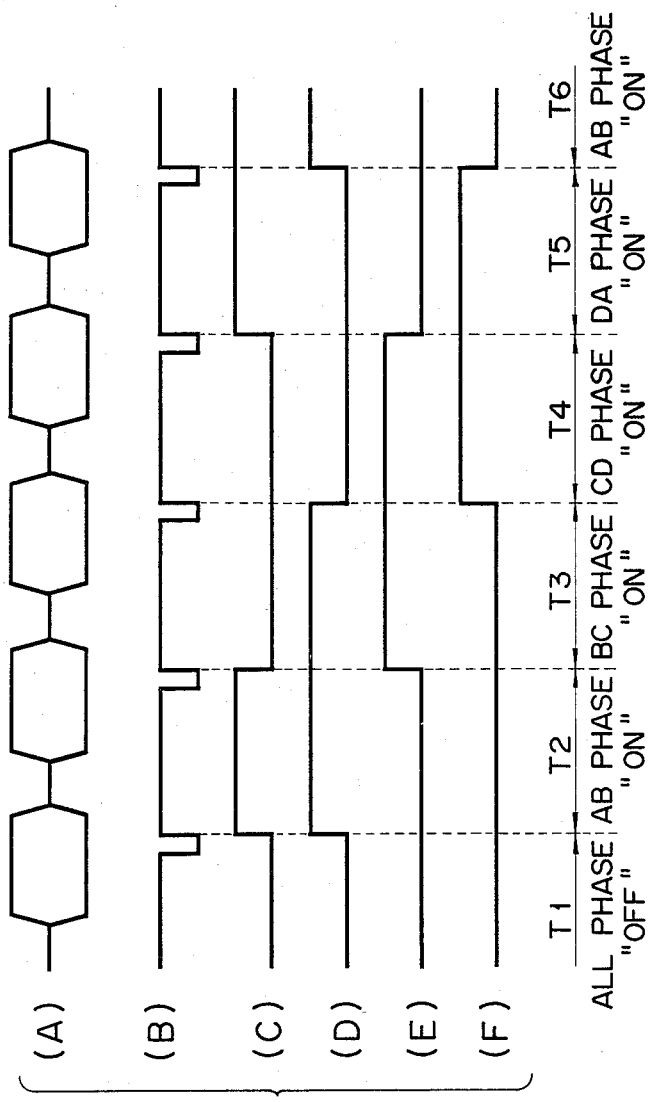
FIGS. 2(A) through 2(F) show signal waveform diagrams for explaining the operation of the pulse motor in FIG. 1.

A pulse motor according to an embodiment of this invention will be explained below:

In the pulse motor shown in FIG. 3, coils 11a, 11b, 11c and 11d having A-, B-, C-and D-phases, respectively, of the pulse motor are connected between a power supply terminal +VM and ground, respectively, through NPN type transistors 12a, 12b, 12c and 12d. A series circuit of zener diode 13a and diode 14a, that of zener diode 13b and diode 14b, that of zener diode 13c and diode 14c and that of zener diode 13d and 14d are connected in parallel with coils 11a, 11b, 11c and 11d, respectively, with their polarities indicated in FIG. 3, noting that these zener diodes act as surge absorption circuits. The pulse motor of FIG. 3 is of such a type that, as in the case of the conventional pulse motor, the A-phase coil 11a and C-phase coil 11c are wound on a common pole with opposite magnetic polarities appearing on the pole and the coils 11a and 11c are always excited so as to produce magnetic poles of opposite polarity. The B-phase coil 11b and D-phase coil 11d are wound on a pole with opposite the magnetic polarities appearing on the pole, and the coils 11b and 11d are always excited so as to produce magnetic poles of opposite polarity.

ROM 16 for control, RAM 17 for control and first phase output latch circuit 18 are connected to CPU 15 via data bus 19. CPU 15 supplies phase control data, together with data write signal S1, to first phase output latch circuit 18 on the basis of program data. First phase output latch circuit 18, upon receipt of data write signal S1, takes the phase control data from data bus 19 and latches the data therein. The phase control signals from output terminals Q1, Q2, Q3 and Q4 of latch circuit 18 are supplied to second phase output latch circuit 20 and to a first input of each of four 2-input type AND gates 21, 22, 23 and 24, respectively. The data write signal S1 from CPU 15 is fed, as a trigger signal, to monostable multivibrator 25. Monostable multivibrator 25 upon receipt of the signal S1 delivers a data write signal S2, from its output terminal $\overline{Q}$ to second phase output latch circuit 20 after a predetermined time has passed. Second phase output latch circuit 20 upon receipt of the data write signal S2 takes a phase control signal from first phase output latch circuit 18 and latches therein. The phase control signals from the output terminals Q1, Q2, Q3 and Q4 of latch circuit 20 are supplied to second input terminals of AND gates 21, 22, 23 and 24, respectively. The outputs of AND gates 21, 22, 23 and 24 are supplied to the bases of transistors 21, 22, 23 and 24, respectively.

Phase control data and data write signal S1 are supplied from CPU 15 to first phase output latch circuit 18 at the times shown in FIGS. 4A and 4B, respectively.

In the embodiment of this invention, if data write signal S1 is input to first phase output latch circuit 18 in a time period T1 in which all the phase control signals are set at the low level and then a time period T2 is started, the outputs Q1, Q2, Q3 and Q4 of latch circuit 18 produce phase control signals as shown in FIGS. 4C through 4F. Monostable multivibrator 25 upon receipt of the data write signal S1 is operated to produce the data write signal S2, at its output terminal $\overline{Q}$, as shown in FIG. 4G. That is, the output terminal $\overline{Q}$ of monostable multivibrator 25 produces a low-level signal over a fixed time. In this case, the fixed time is set to be longer than the turn-OFF time of respective transistors 12a, 12b, 12c and 12d. After the passage of the fixed time a high level output signal is generated from the output terminal $\overline{Q}$ of monostable multivibrator 25 and second phase output latch circuit 20 takes a phase control signal from first phase output latch circuit 18 and latches the signal therein. Phase control signals as shown in FIGS. 4H to 4K are generated from the output terminals Q1, Q2, Q3 and Q4, respectively. However, phase control signals whose leading edge (rise) alone are delayed by a fixed time behind the phase control signals shown in FIGS. 4C to 4F are supplied respectively through AND gates 21, 22, 23 and 24 to the bases of transistors 12a, 12b, 12c and 12d. In this way, current flows through A-phase coil 11a and B-phase coil 11b alone.

In a time period T3, the output signals from first phase output latch circuit 18 vary as shown in FIGS. 4C to 4F and thus the output signals from second phase output latch circuit 20 vary as shown in FIGS. 4H to 4K. In this case, phase control signals whose leading edges (rise) are delayed by a fixed time behind the phase control signals shown in FIGS. 4C to 4F are fed respectively through AND gates 21, 22, 23 and 24 to the bases of transistors 12a, 12b, 12c and 12d. In this way, current is passed through B-phase coil 11b and C-phase coil 11c alone. In the same way, in a time period T4 the C-phase coil 11c and D-phase coil 11d alone are energized, in a time period T5 the D-phase coil 11d and A-phase coil 11a alone are energized and in a time period T6 the A-phase coil 11a and B-phase coil 11b alone are energized. In this way, the excitation states of respective coils 11a, 11b 11c and 11d are switched in the order of the A-and B-phases, B-and C- phases, C-and D-phases and D-and A-phases, causing the motor to be rotated.

Now suppose that, for example, the operation time period is switched from the time period T2 to the time period T3. At this time, transistor 12a starts to be turned OFF a predetermined time before transistor 12c is turned ON. Consequently, transistor 12a is rendered positively in the OFF state after the predetermined time has passed. Since transistor 12a is rendered positively in the OFF state when transistor 12c is turned ON, there is no possibility that excitation current will simultaneously flow through A-phase coil 11a and C-phase 11c. The same thing can also be true of a relation between transistors 12b and 12d when a switching is made from the time period T3 to the time period T4, a relation between transistors 12c and 12a when a switching is made from the time period T4 to the time period T5, and a relation between transistors 12d and 12b when a switching is made from the time period T5 to the time period T6.

In this way, the transistor to be next turned ON in a phase switching operation is not turned ON until the transistor to be next turned OFF is positively turned OFF. Thus, there is no possibility that current will simultaneously flow through the two phase coils on the common core. As a result, there is no risk that the inductance components of the coils cancel each other and that an abnormally large current will flow through respective transistors 12a, 12b, 12c and 12d. It is thus possible to protect the transistors from their destruction.

Although in the aforementioned embodiment a hardware circuit comprised of two phase output latch circuits, monostable multivibrator and AND gates is utilized to permit the starting of turn-ON time of the transistor to be delayed by the turn-OFF time of the transistor, this invention is not necessarily restricted to the aforementioned embodiment. This control can be achieved using a corresponding control program. Even in this case, one phase output latch circuit is necessary.

In place of latch circuit 20 and monostable multivibrator 25, use is made of another type of delay circuit which is responsive to a phase signal from latch circuit 18 to permit only the leading edge of the phase signal to be delayed by a predetermined time.

What is claimed is:

1. A pulse motor comprising:

A- and C-phase coils wound on a common pole;

B- and D-phase coils wound on a common pole;

first, second, third and fourth switching means connected in series with the A-, B-, C- and D-phase coils, respectively, and having an ON state for passing current to the respective phase coils and an OFF state for blocking current to the respective phase coils; and control means including means for generating phase control signals for controlling respective conduction states of said first, second, third and fourth switching means to permit a sequential excitation of the A-and B-phase coils, B-and C-phase coils, C-and D-phase coils, and D-and A-phase coils in this order and so as to excite the A, C coils and B, D coils to generate, respectively, oppositely directed magnetic fluxes, and delay means for, after a predetermined time following a start of a transition from said ON state to said OFF state of one of the first, second, third and fourth switching means in the respective phase switching operation time, changing the state of another one of said switching means from the OFF state to the ON state.

2. A pulse motor according to claim 1, wherein said delay means delays the phase control signals from said phase control signal generating means by said predetermined time, and said control means further comprises logic circuit means for supplying to the corresponding switching means an output signal corresponding to a logical product of the phase control signal from said phase control signals generating means and an output signal from said delay means.

3. A pulse motor according to claim 2, wherein said switching means is comprised of a transistor.

4. A pulse motor according to claim 2, wherein said phase control signal generating means comprises a data generator for generating a control signal and phase control data, and a first signal generator responsive to said control signal to generate a phase control signal corresponding to said phase control data.

5. A pulse motor according to claim 4, wherein said delay means comprises a delay circuit for delaying said control signal from said data generator, and a second signal generator responsive to an output signal from said delay circuit to generate a phase control signal corresponding to said phase control signal from said first signal generator.

6. A pulse motor according to claim 5, wherein said first and second signal generators are each comprised of a latch circuit.

7. A pulse motor according to claim 5, wherein said delay circuit is comprised of a monostable multivibrator.

8. A pulse motor according to claim 5, wherein said logic circuit includes AND gates for receiving phase signals from said first and second signal generators.

* * * * *